Sept. 20, 1955 E. W. WHITTIER 2,718,619
ELECTRICAL CAPACITY MEASURING CIRCUIT
Filed May 24, 1950

*INVENTOR.*
ELLERTON W. WHITTIER
BY
Curtis, Morris + Safford
*ATTORNEYS*

United States Patent Office 2,718,619
Patented Sept. 20, 1955

2,718,619

ELECTRICAL CAPACITY MEASURING CIRCUIT

Ellerton W. Whittier, Needham, Mass., assignor to The Foxboro Company, Foxboro, Mass., a corporation of Massachusetts Application May 24, 1950, Serial No. 163,959

4 Claims. (Cl. 324—61)

This invention relates to electrical instruments for determining certain values or characteristics of objects or matter by measuring the capacity change effect of placing such objects or matter within the electrostatic field of a "measuring" condenser.

The type of instrument with which this invention is concerned is illustrated in the patent to Allen, 1,824,745 dated September 22, 1931. The present invention, as may be seen in the accompanying drawings, Figs. 1, 2, 5, and 6, is particularly concerned with the "measuring" condenser $C_m$ shown therein, and the circuit immediately electrically associated therewith. A comparable "measuring" condenser is shown in the above mentioned patent, in Fig. 17, at the right, the condenser being indicated by the letter C.

Such instruments are provided with electrical circuits with which the "measuring" condenser is associated. This invention is particularly concerned with devices and arrangements for electrically relating such a "measuring" condenser and/or its effects, to such a circuit.

A factor involved in such instruments is that the "measuring" condenser capacity variations may be substantially nonlinear with respect to increments or decrements in the values or characteristics of the objects or matter placed within the electrostatic field of the "measuring" condenser. Another factor is the change in the "measuring" condenser capacity variations due to changes in the values or characteristics in the objects or matter, but not specifically measured.

It is an object of this invention to provide a new and improved instrument of the type referred to above, by so electrically relating the "measuring" condenser to the circuit of the instrument as to substantially reduce the degree of nonlinearity in the capacity variations with respect to related changes in the values or characteristics of the objects or matter placed within the electrostatic field of the "measuring" condenser.

It is a further object to provide means for compensating for the variance in the "measuring" condenser capacity variations due to temperature or other not specifically measured changes in the objects or matter being measured.

These and other objects will be apparent from the following specifications and claims, taken in the light of the accompanying drawings, in which:

Figure 1:
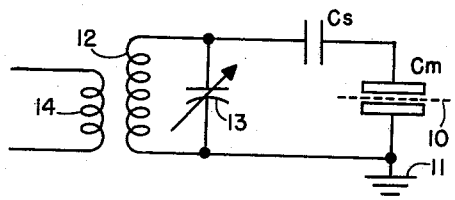
Figure 1 is a showing of a portion of an instrument circuit, illustrating a circuit arrangement of this invention which may be used to substantially reduce the degree of non-linearity in capacity variations.

Referring to Fig. 1, at the right of the drawing, the "measuring" condenser is indicated as $C_m$. Between the plates of the condenser $C_m$ there is a dotted line 10, representing the object or matter under test, as being located within the electrostatic field of the condenser $C_m$. Thus the "measuring" condenser is shown to be that condenser which is used to receive, within its electrostatic field, the object or matter which is under test. This invention includes the use of a measuring condenser which utilizes the "spray" field only thereof, that is, where the objects or matter under test are not actually placed between the plates of the measuring condenser.

One side of the condenser $C_m$ is grounded as at 11, and the other side is connected to a series arranged condenser $C_s$. This series condenser, as will be explained, is the key to this invention. It is preferably manually controlled with respect to different dielectric conditions in the objects or matter under test. The remainder of the circuit of Fig. 1 is at the left of the drawing, in the form of an adjustable (tunable) circuit comprising an impedance coil 12 and a variable condenser 13 arranged in parallel with both the coil 12 and the condenser $C_m$. This tunable circuit may be considered to be in immediate electrical association with the condenser $C_m$, and the condenser $C_m$ is considered to be coupled, through the series condenser $C_s$, to the circuit comprising the impedance 12 and the variable condenser 13. The entire circuit of Fig. 1 may be coupled, as shown at the left thereof, to the remainder of the circuit of the instrument, through a coil 14 in association with the coil 12.

Although the measuring condenser $C_m$ of this invention is indicated as being associated with the remainder of the instrument circuit through the impedance coupling 14, it is to be understood that this is merely by way of illustration, and other forms of coupling or connection may be readily adopted if desired. For example, the measuring condenser may be connected to a Wheatstone bridge arrangement. For the purposes of this invention such a bridge arrangement may be considered to be an adjustable circuit The circuit arrangement of this invention lends itself to applications where a range of capacity variation is to be recorded, as indicative of the variation of a particular factor or characteristic of an object or body of matter, but because of the variation of some other factor, the capacity variation is minimized or accentuated under certain circumstances so that ordinarily the recording would not be truly representative of the particular factor or characteristic alone.

The circuit arrangement of this invention is useful where the capacity change varies substantially with changes in the particular factor or characteristic of the object or body of matter under test. That is, where the capacity variation is nonlinear to a substantial degree.

The series condenser $C_s$ accomplishes the desired results of keeping the capacity variation essentially linearly representative of the variation of the particular factor or characteristic to be recorded. The condenser $C_s$ is a coupling between the condenser $C_m$ and the tunable circuit comprising the coil 12 and the variable condenser 13, and may be said to "decouple" the condenser $C_m$ from that circuit more effectively at the higher capacity values than at the low capacity values. This is illustrated in Figs. 3 and 4, as will be explained.

Figure 3:
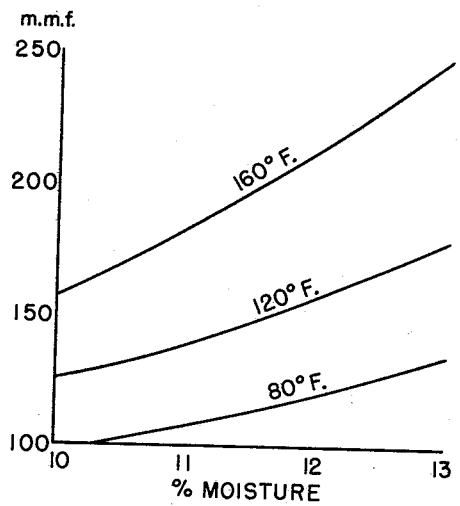
Figure 3 is a graph illustrating nonlinear, prior art "measuring" condenser capacity variations.
Figure 4:
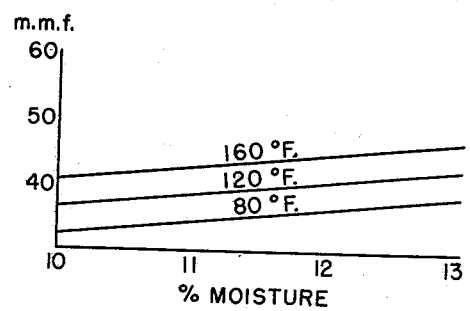
Figure 4 is a graph illustrating "measuring" condenser capacity variations possible with the arrangement of this invention, showing the degree of nonlinearity substantially reduced.

The curves of Figs. 3 and 4 represent, as an illustration, the measurement of absorbed moisture in seeds and seed products, taken in bulk. A common use for this type of instrument other than this is the continuous measurement of thickness of strip material. Fig. 3 shows the curves resulting when the condenser Cs is not used, and Fig. 4 when Cs is used. In both instances there are several curves, representing different temperature conditions. The absorbed moisture so changes the dielectric constant of the seeds in the condenser Cm as to change the capacity of Cm in relation thereto.

Considering, for example, the curve indicated as the 160° F. curve in both figures, it will be seen that in Fig. 3, without the series condenser Cs, the capacity curve is nonlinear to a substantial degree. Referring now to Fig. 4, the same conditions obtain that produced the curves of Fig. 3, except that the series condenser Cs is used, calculated to be about 75 mmf. for this example and connected in the arrangement of Fig. 1. A notable change is that the different temperature curves are straightened and have all been brought more towards the horizontal, evidencing that the nonlinearity in capacity variation with respect to moisture content variation has been substantially reduced.

The effect of other factors than moisture, such as electrical losses in the object or matter under test, is greatly reduced because the condenser Cs also reduces the degree of nonlinearity in the capacity variations due to such losses. The value of Cs at 75 mmf. allows a slight divergence of the curves to compensate for the increase in losses at Cm for the higher temperatures.

A smaller capacity at Cs can cause the curves to converge at their upper ends, if desired. In each special case the appropriate value of Cs can be calculated. Plastic or other materials to be measured have various temperature coefficients of capacity, each of which may be used in calculating the particular Cs value needed for the particular case.

Figure 2:
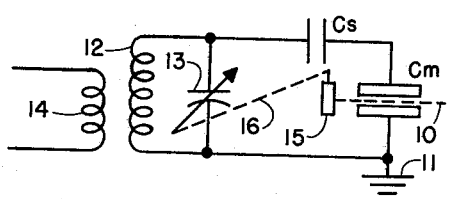
Figure 2 is a showing of a circuit portion similar to that of Fig. 1, illustrating an arrangement of this invention with capacity variation temperature compensation.

The change due to temperature, under the conditions of Figs. 3 and 4, is so substantial that, although it is reduced by using the condenser Cs, it is desirable to further reduce it so that all the curves of Fig. 4 become essentially a single line. This may be accomplished by a temperature compensation arrangement as illustrated in Fig. 2, which will be explained hereinafter.

The effect of the condenser Cs on the capacity of the circuit in reducing the degree of nonlinearity is due to its series arrangement with Cm. Assuming a series of mmf. values for Cm to be 50, 200, 400, and 800 mmf., without the condenser Cs, the capacity range would be 750 mmf. However, with Cs, the necessary capacity range is only about 55 mmf., where Cs is given the arbitrary value of 100 mmf. This range is determined by using the formula with respect to determining the total capacity of condensers in series: i. e., $$\frac{1}{C_t} = \frac{1}{C_1} + \frac{1}{C_2}$$

where $C_t$ is the total capacity; $C_1$ is Cs; and $C_2$ is Cm.

$C_t$ where Cm is 50 mmf.=33+ mmf.
$C_t$ where Cm is 200 mmf.=66+ mmf.
$C_t$ where Cm is 400 mmf.=80 mmf.
$C_t$ where Cm is 800 mmf.=88+ mmf.
} 55 mmf. range Referring to Fig. 1, it is essential, as a practical matter, that the circuit which is coupled to the measuring condenser Cm by the series condenser Cs, be an adjustable, in this case meaning tunable, circuit. In this instance it is the circuit comprising the coil 12 and the variable condenser 13, which is tunable. The tuning of this circuit is accomplished by adjusting the variable condenser 13, and has the effect of giving a desired starting point to the total capacity of the whole circuit of Fig. 1. It is a zeroing action, with respect to the particular capacity values assigned to the series and measuring condensers Cs and Cm, and considering whatever body or matter is to be associated with the measuring condenser Cm.

Without such a tuning arrangement it would be impractical to provide the whole circuit with a particular total capacity because of the necessity of extreme accuracy in winding the coil 12 and in determining and producing the exact capacity value needed for the condenser 13. In such a fixed arrangement also, the least change in operating conditions would throwh the values off and make the circuit inaccurate with respect to the particular conditions which are concerned in a particular measurement or series of measurements.

Referring to Fig. 2, the circuit is the same as that of Fig. 1, with the addition of a temperature compensation arrangement as previously mentioned herein. This arrangement comprises a temperature sensitive element 15 associated with the measuring condenser Cm to determine the temperature and variations thereof of the body or matter under test. The element 15 is connected, as indicated at 16, to the variable condenser 13 so that temperature variations in the body or matter under test are reflected in related adjustments of the condenser 13. The effect of this temperature compensation, for example with reference to Fig. 4, is to join the different temperature capacity curves into a single capacity curve for all of the different temperatures. A thermally actuated variable condenser whose rangeability is 8.5 mmf. and which is arranged to reduce capacity with increase of temperature is correct to suit the particular example under consideration.

Figure 5:
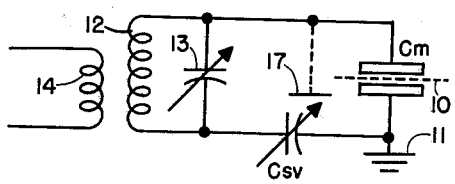
Figure 5 is a showing of a variation of the circuit of Fig. 1.

Referring to Fig. 5, the circuit is essentially the same as that of Fig. 1, with an additional capacity variation. The series condenser Csv is the variable counterpart of Cs. A parallel condenser, variable with the series condenser Csv, is provided by placing a condenser plate 17 adjacent Csv and connecting the plate 17 to the opposite side of coil 12 with respect to Csv. The plate 17 is so shaped and positioned relative to the grounded rotor plate of Csv that the adjustment of Csv produces automatic zero correction for various dielectric conditions of objects or matter in Cm.

Figure 6:
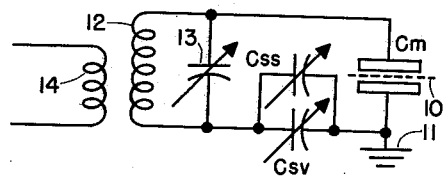
Figure 6 is a showing of another variation of the circuit of Fig. 1.

Various other condenser arrangements may be used in the general circuit of this invention if desired. One of these, as shown in Fig. 6, is a condenser arranged in series with Cm and in parallel with Csv as a spread control for Csv, for varying the range of Csv for a particular relation of Cm to the body or matter being tested therein. Taken as a whole, Fig. 6 shows an arrangement which is valuable in that it permits rapid matching of duplicate sets of parts of the circuit, where the physical and electrical properties are not of themselves identical. This matching produces a comparable capacity change across coil 12 for a given increment of matter in Cm, regardless of the amount of matter therein before the increment is added, enabling rapid establishment of identical mechanical settings of Csv for various amounts of matter in Cm, and so establishing such settings even though the plate separation among various Cm units is not held to close mechanical tolerances.

In some instances, the use of a fixed condenser Cs having either a negative or positive temperature coefficient of capacity would be desirable as a means of aiding in the control of the total capacity of the circuit of Fig. 1 under varying capacity values of Cm.

A type of measurement in which the condenser Cm may be used in this invention is the situation in which the space between the Cm condenser plates is kept filled with material and the dielectric change occurs through changes in the material. For example, seeds or seed products may be measured for moisture content. Another type is the situation where a continuous measurement of the thickness of a material is made. An example of this is the thickness measurement of rubber sheeting in which the rubber does not necessarily fill the space between the condenser plates. In short, this invention, as particularly directed to a series condenser as a coupling for a measuring condenser, contemplates the use of such a series condenser with any type of measuring condenser.

I claim:
1. In an electrical device for measuring a character- istic of material inserted within the electro-static field of a measuring condenser, the combination of, a measuring circuit including terminals which are common to the input and output of said measuring circuit and which are adapted to be connected to an instrument for measuring the effective shunt capacity of said measuring circuit between said terminals, an adjustable zeroing condenser connected directly from one to the other of said terminals for setting said effective shunt capacity of said measuring circuit to a predetermined value, a measuring condenser adapted to receive the material to be tested within its electro-static field, and a response-compensating condenser, said measuring condenser and said response-compensating condenser being connected in a series circuit, and said series circuit being connected between said terminals in parallel with said adjustable condenser, whereby the linearity of response of the effective shunt capacity of the measuring circuit with respect to variations of the characteristic of the material being measured is greater than the linearity of response of the measuring condenser alone with respect to the same variation in characteristic of the material being measured.

2. An electrical device as recited in claim 1 including means responsive to the ambient temperature of the material being measured for adjusting the capacity of the adjustable zeroing condenser.

3. An electrical device as recited in claim 1 wherein said response-compensating condenser includes at least three separate condenser plates, a pair of said plates providing the response-compensating capacitance of said compensating condenser connected to one side of said measuring condenser so as to be in series therewith, and a third plate connected to the other side of said measuring condenser and cooperating with one of the plates of said pair to form a zero-correction capacitance.

4. An electrical device as recited in claim 1 and including a variable spread control condenser connected in parallel with said response-compensating condenser.

References Cited in the file of this patent

UNITED STATES PATENTS

| | | |
|---|---|---|
| Re. 23,368 | Grob et al. | May 22, 1951 |
| 1,824,745 | Allen | Sept. 22, 1931 |
| 1,824,746 | Allen | Sept. 22, 1931 |
| 2,251,641 | Stein | Aug. 5, 1941 |
| 2,357,860 | Whitaker | Sept. 12, 1944 |
| 2,422,742 | Odessey | June 24, 1947 |
| 2,477,511 | Comb | July 26, 1949 |
| 2,485,579 | Elliott | Oct. 25, 1949 |
| 2,543,570 | Eder | Feb. 27, 1951 |